US 8,874,432 B2

(12) United States Patent
Qi et al.

(10) Patent No.: US 8,874,432 B2
(45) Date of Patent: Oct. 28, 2014

(54) SYSTEMS AND METHODS FOR SEMI-SUPERVISED RELATIONSHIP EXTRACTION

(75) Inventors: Yanjun Qi, Princeton, NJ (US); Bing Bai, North Brunswick, NJ (US); Xia Ning, Princeton, NJ (US); Pavel Kuksa, Princeton, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 612 days.

(21) Appl. No.: 13/078,985

(22) Filed: Apr. 3, 2011

(65) Prior Publication Data

US 2011/0270604 A1 Nov. 3, 2011

Related U.S. Application Data

(60) Provisional application No. 61/328,753, filed on Apr. 28, 2010, provisional application No. 61/393,067, filed on Oct. 14, 2010.

(51) Int. Cl.
*G06F 17/27* (2006.01)
*G06F 17/30* (2006.01)

(52) U.S. Cl.
CPC .......... *G06F 17/2785* (2013.01); *G06F 17/271* (2013.01); *G06F 17/30684* (2013.01)
USPC .................................. 704/9; 707/776; 706/13

(58) Field of Classification Search
CPC ............. G06F 12/271; G06F 17/2775; G06F 17/2785; G06F 17/30684
USPC .................................. 704/9; 707/776; 706/13
See application file for complete search history.

(56) References Cited

U.S. PATENT DOCUMENTS

| | | | | |
|---|---|---|---|---|
| 8,494,987 B2* | 7/2013 | Katukuri et al. | | 706/13 |
| 2011/0213804 A1* | 9/2011 | Lee et al. | | 707/776 |

OTHER PUBLICATIONS

Nguyen, Truc-Vien T., Alessandro Moschitti, and Giuseppe Riccardi. "Convolution kernels on constituent, dependency and sequential structures for relation extraction." Proceedings of the 2009 Conference on Empirical Methods in Natural Language Processing: vol. 3-vol. 3. Association for Computational Linguistics, 2009.*

Bach, Nguyen, and Sameer Badaskar. "A review of relation extraction." Literature review for Language and Statistics II (2007).*

Weston, Jason, et al. "Semi-supervised protein classification using cluster kernels." Bioinformatics 21.15 (2005): 3241-3247.*

Yang, Jiong, and Wei Wang. "Towards automatic clustering of protein sequences." Bioinformatics Conference, 2002. Proceedings. IEEE Computer Society. IEEE, 2002.*

Bunescu, Razvan C., and Raymond J. Mooney. "A shortest path dependency kernel for relation extraction." Proceedings of the conference on Human Language Technology and Empirical Methods in Natural Language Processing. Association for Computational Linguistics, 2005.*

(Continued)

*Primary Examiner* — Vincent P Harper
(74) *Attorney, Agent, or Firm* — Joseph Kolodka

(57) ABSTRACT

Systems and methods are disclosed to perform relation extraction in text by applying a convolution strategy to determine a kernel between sentences; applying one or more semi-supervised strategies to the kernel to encode syntactic and semantic information to recover a relational pattern of interest; and applying a classifier to the kernel to identify the relational pattern of interest in the text in response to a query.

25 Claims, 6 Drawing Sheets

(56) References Cited

OTHER PUBLICATIONS

Weston, Jason, et al. "Deep learning via semi-supervised embedding." Neural Networks: Tricks of the Trade. Springer Berlin Heidelberg, 2012. 639-655.*

Reichartz, Frank, Hannes Korte, and Gerhard Paass. "Dependency tree kernels for relation extraction from natural language text." Machine Learning and Knowledge Discovery in Databases. Springer Berlin Heidelberg, 2009. 270-285.*

A. Airola, S. Pyysalo, J. Bj orne, T. Pahikkala, F. Ginter, and T. Salakoski. All-paths graph kernel for protein-protein interaction extraction with evaluation of cross-corpus learning. BMC bioinformatics, 9 Suppl 11, 2008.

X. Ning, Y. Qi (2011) "Semi-Supervised Convolution Graph Kernels for Relation Extraction", SIAM 2011 International Conference on Data Mining (SDM2011.

P. Kuksa, Y. Qi, B. Bai, R. Collobert, J.Weston, V. Pavlovic, X. Ning (2010), "Semi-Supervised Abstraction-Augmented String Kernel for Multi-Level Bio-Relation Extraction", ECML PKDD 2010 (European Conference on Machine Learning and Principles and Practice of Knowledge Discovery in Databases).

R. C. Bunescu and R. J. Mooney. A shortest path dependency kernel for relation extraction. HLT 05: articles of the conference on Human Language Technology and Empirical Methods in Natural Language Processing, pp. 724-731, 2005.

D. Haussler. Convolution kernels on discrete structures. Technical report, University of Santa Cruz, 1999.

Bunescu, R., Mooney, R.: Subsequence kernels for relation extraction. In: Weiss, Y., Schaolkopf, B., Platt, J. (eds.) NIPS'06, pp. 171-178 (2006).

Cancedda, N., Gaussier, E., Goutte, C., Renders, J.M.: Word sequence kernels. J. Mach. Learn. Res. 3, 1059-1082 (2003).

Collobert, R., Weston, J.: A unified architecture for nlp: deep neural networks with multitask learning. In: ICML'08. pp. 160-167 (2008).

Reichartz, F., Korte, H., Paass, G.: Dependency tree kernels for relation extraction from natural language text. In: ECML. pp. 270-285 (2009).

Weston, J., Leslie, C., Ie, E., Zhou, D., Elissee, A., Noble, W.S.: Semi-supervised protein classification using cluster kernels. Bioinformatics 21(15), 3241-3247 (2005).

* cited by examiner

FIG. 4

CD5 — is    CD5 — is – coupled    CD5 - coupled – to
CD5 - coupled · p56lck    protein-syrosine · kinase — p56lck
        the – p56lck    coupled – to    ······

SYSTEMS AND METHODS FOR SEMI-SUPERVISED RELATIONSHIP EXTRACTION

The present application claims priority to U.S. Provisional Application Ser. Nos. 61/328,753 filed Apr. 28, 2010, and 61/393,067 filed Oct. 14, 2010, the contents of which are incorporated by reference.

BACKGROUND

The present application relates to systems and methods for semi-supervised relationship extraction.

Natural Language Processing (NLP) aims to understand and organize unstructured text into structured format, which could enable automatic machine translation, semantic information retrieval or advanced question answer, etc. As a basic step towards automatic text understanding, the task of Relation Extraction (RE) tries to detect if a sentence describes a semantic relation between two entities of interest or not, both the relation and the entities having predefined categories.

RE is a classic NLP problem, where given a sentence, RE aims to detect if there exists a certain semantic relationship between two entities of interest in it. RE is commonly formulated as a binary classification problem as following: embodiments of the system treat a given sentence S as a sequence of n words (denoted by $w_i$ with $i \in \{1, \ldots, n\}$), among which there exist two known entities $e_1$ and $e_2$ (that are also words).

$$S = w_1 w_2 \ldots e_1 \ldots e_2 \ldots w_{n-1} w_n \quad (1)$$

For a certain type of relationship R, a RE system aims to learn a function $F_R$ so that $$F_R(S) = \begin{cases} +1 & \text{if } e_1 \text{ and } e_2 \text{ are associated by the relation } R \\ -1 & \text{otherwise} \end{cases}$$

The RE systems have two key components: (1) data representation, that is, how to encode the semantic and syntactic information within text sentences in a meaningful style. (2) learning algorithm which utilizes the sentence representation to optimally classify whether given sentences are related to a predefined relation R or not.

Over years, there have been many methods proposed to solve the relation extraction (RE) problem. Such methods normally represent words as Part-of-Speech (POS) tags or related ontology terms. Widely used sentence representations include parse tree and dependence parsing graphs. Despite years of progress, automatic RE still remains a challenging task due to two reasons. First of all, feature-representations of English sentences are hard for RE problem because the task is associated to both the syntactic structures and the semantic patterns of natural text. Secondly, the lack of sufficient annotated examples for model training also limits the capability of current RE systems.

SUMMARY

Systems and methods are disclosed to perform relation extraction in text by applying a convolution strategy to determine a kernel between sentences; applying one or more semi-supervised strategies to the kernel to encode syntactic and semantic information to recover a relational pattern of interest; and applying a classifier to the kernel to identify the relational pattern of interest in the text in response to a query.

Advantages of the preferred embodiments may include one or more of the following. The system achieves the state-of-the-art performance on relation extraction benchmark data sets. Also with the levels of semi-supervisions added on convolution sequence kernels, the system can work on RE problems with only a few training examples. Moreover the system is highly extendible. For example, the semi-supervised string kernel can be applied to on one benchmark protein sequence classification task and get improved performances over all tested supervised and semi-supervised string kernel baselines.

BRIEF DESCRIPTION OF THE DRAWINGS

FIG. 4 shows an exemplary graph decomposition into short single paths.

DETAILED DESCRIPTION

Figure 1:
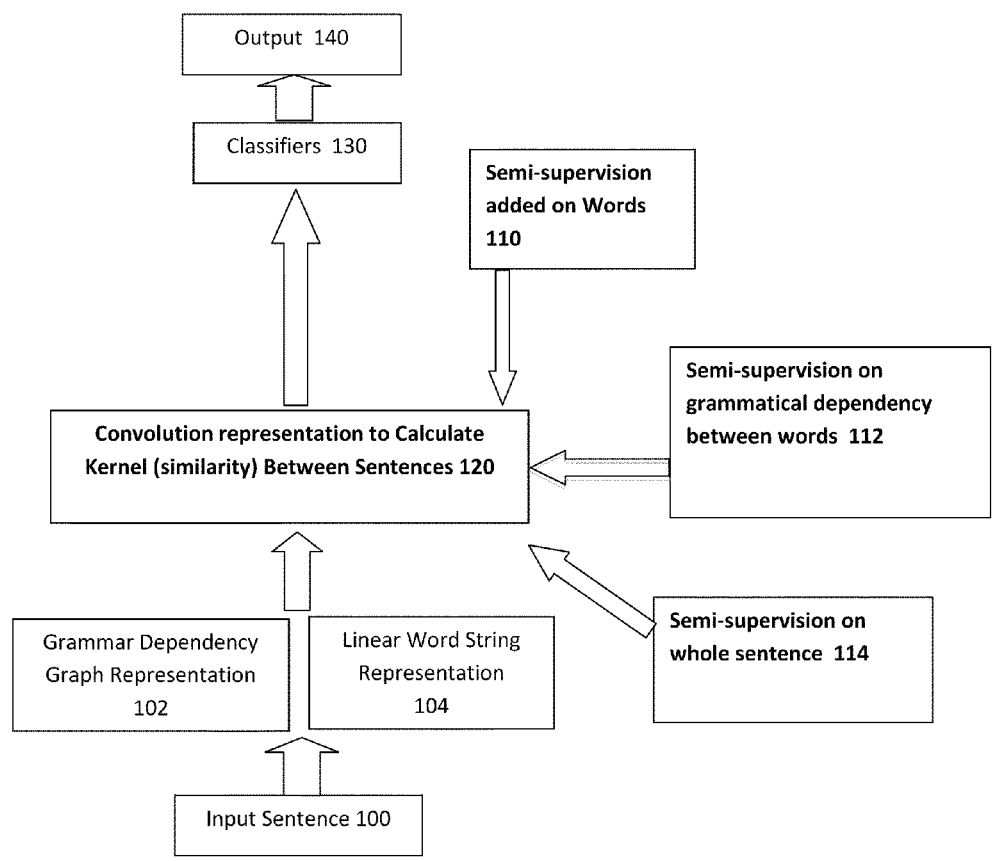
FIG. 1 shows an exemplary system to recover relational patterns of interest.

FIG. 1 shows an exemplary system to recover relational patterns of interest. An input sentence is presented (100). The sentence is parsed into a grammar dependency graph representation (102) and a linear word string representation (104) and provided to a convolution strategy module to determine kernel or similarity between sentences (120). The module also receives input from a semi-supervised module for add-on words (110), a semi-supervised module on grammatical dependency between words (112) and a semi-supervised module on whole sentence determination (114). The convolution module output is sent to one or more classifiers (130) that generate relational pattern recognition as output (140).

Through convolutions and multi-level semi-supervisions (i.e., word embedding and/or abstraction on embeddings, dependency similarity and pseudo positive sentences), the sequence kernels provide powerful models to encode both syntactic and semantic evidences that are important for effectively recovering the relational patterns of interest.

(1) In one embodiment, a semi-supervised convolution graph kernel (SCGK) takes advantages of grammatical dependence relations between words in a sentence and thus generates graph representations for sentences. The SCGK computes kernels (similarities) between sentences using a convolution strategy, i.e., calculating similarities over all possible short single paths on two dependency graphs. The graph representation is able to encode syntactic of English sentences. During the kernel calculations, SCGK adds three semi-supervised strategies to enable soft matching between (1) words, (2) grammatical dependencies, and (3) entire sentences, respectively. From a large unannotated corpus, these semi-supervision modules learn to capture contextual semantic patterns of elements inside natural sentences, and therefore alleviate the lack of annotated examples in most RE corpora.

The SCGK embodiment solves Relation Extraction task as a sentence classification problem using Support Vector Machine classifier. In one method, each sentence is represented as a graph with words as graph vertices and syntactic dependencies between words as corresponding edges. Consequently the dependency graph representation provides a powerful structure to encode grammatical patterns between words. To encode semantic patterns beyond syntax, SCGK applies three semi-supervised steps to groups similar elements inside text sentences. For instance, the semi-supervision on words provides an embedded representation for each word in the dictionary which was learnt to capture contextual semantic similarities between words from a large unannotated corpus. Finally a convolution kernel strategy is proposed to calculate the similarities (i.e. kernels under SVM framework) between sentences using not only the dependency graph structures, but also the semi-supervised semantic representations of text elements in the sentences. Essentially the proposed convolution strategy calculates similarities over all possible short single paths from two dependency graphs. This is partly motivated by the fact that semantic relations between name entities are mostly localizing to effective substructures in dependency graphs. In summary, SCGK provides a unified model to combine text semantic patterns, sentence syntactic structures, and local relational substructures together, which are all essential parts for solving relation extraction problems.

(2) In another embodiment uses a semi-supervised convolution string kernel. This kernel represents the English sentences as the linear ordering word strings and tackle multi-level RE tasks as string comparisons. The embodiment computes kernels (similarities) between sentences using a similar convolution strategy as SCGK, i.e., calculating similarities over all possible short string segments, but with mismatches in the string kernel framework. The string kernel uses a semi-supervised abstraction step, which groups similar words to generate more abstract entities, based on the word embeddings learnt from a large unlabeled corpus. This semi-supervision operation captures contextual semantic similarities between words from the large unannotated corpus and allows for a better generalization of patterns learned from annotated examples.

Embodiments of the system adopt Support Vector Machines (SVM) framework as the learning method for solving RE. SVM is a widely used binary classification approach, which achieves the state-of-the-art performance in many application domains. Given a set of positive training instances $C^+$ and a set of negative training instances $C^-$, the SVM framework learns a classification function $f(x)$ of the following form $$f(x) = \sum_{c_i \in C^+} \lambda_i^+ K(x, c_i) - \sum_{c_i \in C^-} \lambda_i^- K(x, c_i) \quad (2)$$

where $\lambda_i^+$ and $\lambda_i^-$ are non-negative weights that are computed during training by maximizing a quadratic objective function. $K(\cdot,\cdot)$ is called the kernel function which is computed to measure the similarity between two instances (e.g. between x and training instance $c_i$ in equation 2). The kernel function must satisfy two mathematical requirements: it must be symmetric, that is, $K(x, x')=K(x', x)$, and positive semi-definite.

Various embodiments of the system adopt the graph representation for describing the relational patterns in natural text sentences where graph nodes representing words and graph edges representing grammatical dependency between words. Consequently, each sentence instance x maps to a graph and the kernel fucntion $K(x, c_i)$ between sentences essentially involves constructing a kernel between graphs, i.e. so-called "graph kernel".

As a structured data representation, graphs have been widely used in many real applications, e.g. chemoinformatics, drug discovery, and social networks analysis, to study relationships between structured objects. Graphs are natural data structures to model relational structures, where nodes represent objects and edges model the relations between them. Enormous efforts have been dedicated to manipulating graphs, particularly within SVM framework and kernel methods. The challenge of "graph kernel" involves the definition of a kernel that captures the semantics inherence between two graphs and at the same time is reasonably efficient to evaluate.

Various embodiments of the system introduce a convolution graph kernel to extract a certain semantic relationship between two entities from natural english text. The method first converts english sentences into a dependency parsing graph representation, and then calculates the kernel function between two sentences using a "convolution" strategy on graphs.

English sentences could be naturally converted into certain graph structures where nodes represent words and edges describe connections between words. The two most popular ones include the widely used parse tree (the concrete syntax tree) and the typed dependency parsing graph from the Stanford dependency scheme.

One problem associated with the parse tree representation is that words, which map to tree leaves, are not directly connected with other words, but via common ancestors. As a result, when a typical tree kernel tries to look for the linkage between two leaves (words) from parse trees, it is unable to directly describe the relational pattern between entities.

The other typed dependency graph representation is based on grammatical dependency relationship among words and has been previously used in comparing natural language sentences. In this scheme, dependencies between pairs of words are defined as a set of triplets $$d(w_i, w_j, g_k), \quad (3)$$

where a grammatical function $g_k$ exists from word $w_i$ to word $w_j$. Dependency g is formally defined by Stanford dependency scheme to have 52 possible types (i.e. grammatical relations) and all types of dependencies belong to binary relations. Embodiments of the system adopt this dependency-based graph representation in the kernel approach, where edges connecting vertices (words) are labeled with their inferred dependency function $g_k$ from Stanford dependency parser. Such a dependency-based graph naturally encodes the grammatical structure within a sentence since edges indicate grammatical roles. Compared to conventional parse trees, this graph format is more explicit and more direct in describing the syntatic information.

Figure 2:
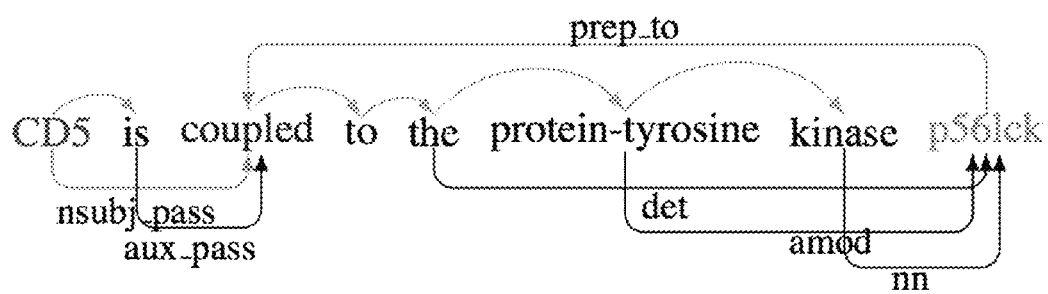
FIG. 2 shows an exemplary sentence.
Figure 3:
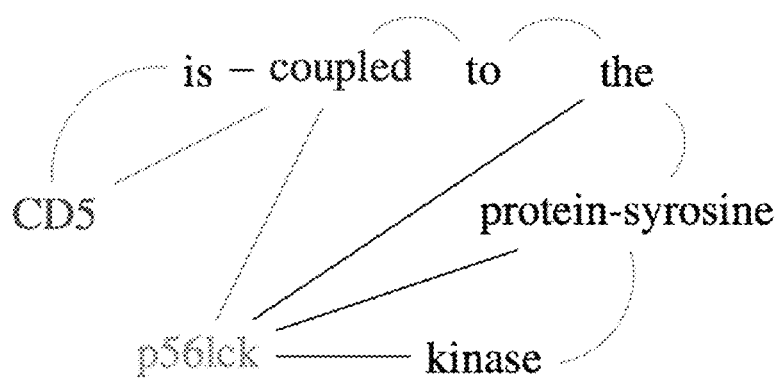
FIG. 3 provides an example of how embodiments of the system construct a graph from the dependency triplets of a given sentence in the example of FIG. 2.

FIG. 3 provides an example of how embodiments of the system construct a graph from the dependency triplets of a given sentence such as in the example of FIG. 2. In the exemplary sentence of FIG. 2, there exist two entities of interest CD5 and p56lck. Edges are labeled with the types of dependencies between two words. The dark and orange edges map to dependency relations, where orange edges are critical for relation extraction. For example, word "CD5" is the subject of word "coupled" in the passive format (i.e., nsub pass dependency), word "kinase" is a noun compound modifier for word "p56lck" (i.e., nn), word "protein-tyrosine" is an adjectival modifier for word "p56lck" (i.e., amod dependency). The gray arrows correspond to the sequential-order edges between words, if no dependency exists.

In FIG. 3, a dependency graph representation for the sentence "CD5 is coupled to the protein-syrosine kinase p56lck.". The directions on edges are dropped. The edges are typed with their dependency labels (though not shown in the figure). Color code of edges means: (1) grey for linear-order edge; (2) black for dependency relation edge; (3) orange for edges critical for relational pattern extraction between two entities of interest (CD5 and p56lck).

Two modifications are added beyond dependency triplets to build the graph, (1) embodiments of the system drop those directions existing in dependency relations to make them undirected edges. This is a reasonable generalization since the predefined relationships covered by most RE task are symmetric, i.e. undirected. (2) It is normally observed that the semantics patterns of a word is associated with its local neighboring words to some extent, e.g. local semantic "chunk". Thus, embodiments of the system add edges between adjacent words (i.e., sequential-order edges from the original linear structure of the sentence). It is worth to mention that embodiments of the system do not add duplicate edges between nodes in the resulting graph.

To summarize, an unweighted undirected graph referred to as $G_D(S)$, is derived for a sentence S from its full set of dependency relations supplemented by its original linear-order structure (i.e. a special case of dependencies), where the whole set is denoted by D(S) in the following. Then, $$G_D(S)=(V(S),E(S)) \quad (4)$$

Here V(s) is the set of vertices, with each $v_i \epsilon V(s)$ representing a certain word w. E(S) is the set of typed edges, each representing a dependency or a sequential pairwise order. Embodiments of the system denote an edge in E(S) as $e(v_i, v_j, k)$ where $v_i \epsilon V(S)$, $v_j \epsilon V(S)$ and $\exists d(w_i, w_j, g_k) \epsilon D(S)$.

As discussed below, such graphs are called dependency graphs. The following description may use "sentence", "graph" and "sentence graph" interchangeably, if not specified. The same protocol applies to "word" vs "vertex", "dependency" vs "edge", respectively.

To use SVM framework for RE, embodiments of the system define a kernel function on graphs which is able to map graphs (sentences) into a new feature space where sentences with similar entity relational patterns are closer/similar to each other compared to those graphs (sentences) with different relational patterns.

Designing kernels on graphs is a challenging task over years with respect to both computational complexity and discriminative power. For the target RE problem, this is even more challenging since embodiments of the system need to formulate a graph kernel, which takes into consideration of both semantic and syntactic structures insider natural sentences.

Most previous RE work relied the assumption that words locating between the candidate entities or connecting them are highly likely to carry information regarding the target relationship. In general, semantic relations between entities range mostly over short substructures in the dependency graphs. Thus the convolution strategy can determine dependency graphs from its possible substructures, e.g. short single paths on the graph. The "convolution" kernel has been applied previously for structured data classification. Conceptually, it states that if a big structure can be decomposed into some sub-structures, then by combining the kernels on substructures it gives a kernel on the original big structure. One competitive advantage of convolution kernel is that it analyzes structured data using a "bottom-up" fashion, which fits well to the representation where dependency graphs have rich substructures on different levels of details.

The system of FIG. 1 decomposes a dependency graph into proper substructures and determines what kernels can be used on its substructures. Since each vertex is only locally related to its neighborhood (of small size), embodiments of the system could decompose a dependency graph into small units in which each vertex (word) is only connected to the close neighbors. Thus, embodiments of the system decompose the graph into all possible single (i.e., no circles) paths up to a certain length. Such single short paths represent local vertex-edge-vertex (i.e. word-dependency-word) patterns, which could well preserve the grammatical relationship between vertices (words). An example of such decomposition is shown in FIG. 4.

A decomposition from dependency graph for the sentence "CD5 is coupled to the protein-syrosine kinase p56lck.". Again, the directions on edges are dropped. The edges are typed but not shown here. If embodiments of the system consider the edge directions from the original dependency graphs, the decomposition can only leave us a significantly fewer number of single paths, where the most informative ones might get lost. For instance, the orange path "CD5-coupled-p56lck" in FIG. 3 does not exist in the directed version of the graph in FIG. 2. Thus, the system drops all the directions in the dependency graph construction.

The convolution decomposition has a number of advantages. First of all, single path is much easier to handle with compared to graphs. At the same time the paths provide direct and informative signals to entity relation entraction. For example, in FIG. 4, the single path "CD5-coupled-p56lck" covers the entities of interest "CD5" and "p56lck" via a word "coupled". The existence of such single path is a strong indication of the target relationship (e.g. protein interaction relation) between the two entities. Secondly, the decomposition can be extremely fast in terms of running time if the graph is sparse, which is exactly the case for most dependency graphs. Thirdly, it is much easier to develop kernel functions for single paths. In particular, embodiments of the system could use the concept of "convolution" again (details discussed later).

A single path p from a dependency graph $G_D(S)$ is composed from a sequence of words and their associated dependencies $$p=(w_i, d_{i,j}, w_j, \ldots, w_p, d_{p,q}, w_q) \quad (5)$$

where word $w_i$ and $w_j$ are connected by the dependency edge $d_{i,j}$. The length of a single path is defined as the number of edges (dependencies) it contains. The entire set of up-to-size-n single paths from a sentence graph $G_D(S)$ is denoted as $P^n(G_D(S))$.

Next, Convolution Graph Kernels via Single Paths are discussed. Given two graphs S and S' decomposed into all possible single paths (up-to-size-n), a convolution kernel (denoted as $K_G$), is defined as the sum of kernels on paths (denoted as $K_p$), that is $$K_G(G_D(S), G_D(S')) = \sum_{p \in P^n(G_D(s))} \sum_{p' \in P^n(G_D(S'))} K_p(p, p') Pr(p | G_D(S)) Pr(p' | G_D(S')) \quad (6)$$

where $\Pr(p|G_D(S))$ is the probability that single path $p$ happens in the graph $G_D(S)$ and it can be calculated as the ratio of path count over sum of all path counts.

In Equation 6, $K_p(p,p')$ describes a kernel on single paths. Embodiments of the system apply the concept of "convolution" again, where a single path could be decomposed into even smaller substructures such that a convolution path kernel can be defined based on smaller substructures. Since a single path (Equation 5) consists of only word nodes and dependency edges, a straightforward way to decompose is to split it into words and dependencies. Therefore, embodiments of the system define the path kernel $K_p$ as following: given two single path $p$ and $p'$, $$p(w_1, d_{1,2}, w_2, \ldots, w_i, d_{i,m}, w_m) \quad (7)$$

$$p'(w'_1, d'_{1,2}, w'_2, \ldots, w'_j, d'_{j,n}, w'_n)$$

then $$K_p(p, p') = \begin{cases} K_w(w_1, w'_1) \prod_{i=1}^{|p|-1} \{K_d(d_{i,i+1}, d'_{i,i+1}) K_w(w_{i+1}, w'_{i+1})\}, \\ \qquad \text{if } |p| = |p'| \\ 0, \text{ otherwise} \end{cases}$$

where $K_w$ is a kernel defined on words and $K_d$ is a kernel on dependencies. Essentially $K_p(p,p')$ is the dot product of corresponding word kernel values and dependency kernel values after aligning the two paths.

The path kernel $K_p$ defined above has three properties:

First of all, there exist two different alignments between two paths (i.e., $w_1$ aligned against $w'_1$, or $w_1$ aligned against $w'_n$) which results in three different path kernel values. Embodiments of the system use the maximum of the three values as the final kernel value between the two paths (not explicitly shown in Equation 7). This is to maximize the possibility that two paths are aligned optimally. However, this nonlinear max operator raises some validity issue for the graph kernel. Thus embodiments of the system employ a common kernel trick to convert a symmetric matrix into a valid kernel matrix. This conversion uses the transductive setting, that is, kernelize the symmetric matrix including not only training data, but also the testing data (a common practice to kernelize matrices).

Secondly, $K_p$ only considers similarities between single paths with the same length, since the optimal alignment between paths of different lengths is computationally hard to handle. Also such an optimal alignment involves a sub-path alignment with the short-length path, which has been covered in $D(S)$ already.

With Equation 7, the path kernel value gets smaller when the path length grows longer. Intuitively, this is desired since longer paths carry less direct pattern information related to RE.

Next, the Word Kernel is detailed. $K_w$ represents the kernel on words in Equation 7. Each word $w$ is represented by a d-dimensional real value vetor $E(w)$ (based on their patterns in a large unlabeled corpora, discussed in details later). Thus embodiments of the system define a word kernel as follows (k is a parameter to tune):

$$K_w(w,w') = \exp(-k \times \|E(w), E(w')\|^2) \quad (8)$$

In Equation 7, $K_d$ is the kernel between the dependencies (including sequential-order edges). There exist only a few types of syntactic dependencies. If the two dependencies have the same type of grammatical function $g$ associated, $K_d(d,d')=1$, otherwise the kernel value gets zero. Embodiments of the system enforce the similarity between any grammatical dependency and sequential order as zero.

After the convolution strategy, we add three kinds of semi-supervisions into the graph convolution kernel. The whole system is named as Semi-Supervised Convolution Graph Kernel. First, with respect to the Semi-Supervision on Words, the dependency graph mainly emphasizes the syntax structure inside a sentence. However, for relation extraction, semantic pattern is also important. So embodiments of the system look for strategies to introduce sentence semantics (i.e. meanings) into the kernel calculation. Since sentence meanings are heavily expressed by its words, this comes down to the question of word representation.

A typical way to represent the words is to use the dictionary index of the word in the vocabulary under consideration. Alternatively the words' POS tagging is also a good candidate, which provides a simple way to cluster words and has been used by many text analysis algorithms. However, a notable drawback with this single-integer approach is that it could not capture semantic patterns of words into account. Instead, embodiments of the system use a word embedding method learning to map every word in the dictionary into a d-dimensional real value vector. Words with similar meanings are mapped into points that are closer in the new d-dim space (with respect to Euclidean distance). Similarly words with different semantic meanings are represented with points locating far away from each other in the d-dim space.

There exist many ways to learn this mapping from a large unannotated text corpus. Embodiments of the system adopt a semi-supervised "language model (LM)" method. LM uses a multiple-layer perceptron network classifier and modify it with a so-called "lookup table" layer (as the first layer) which converts word tokens to real value vectors. The whole LM aims to learn a latent space in which words with similar meanings can be automatically clustered together. The meanings of words are considered by looking at the word's contextual neighbors (local short word window with length 7). One LM embodiment uses a semi-supervised task that forces two sentences with the same semantic labels to have similar representations in the shared layers of neural network, and vice versa. Training for this task is achieved by assigning a positive label to genuine fragments of natural language, and negative labels to fragments that have been synthetically generated. Thus, a 50-dimension vector of real values is learned for each word (i.e., graph vertex) in the embedding space (represented by the "lookup table" layer. Such embedding representation offers enriched semantic information of words in a context-sensitive way (as discussed below and shown in FIG. 7). For instance the most similar words of word "protein" includes "ligand, subunit, proteins, receptor, molecule" using the LM embedding (see details in Table 1). Also the real value representation makes it possible to quantitatively compare semantics among words (i.e. by soft-matching of embedding vectors). Other word embedding strategy could also be used in calculating word kernel. For instance, word co-occurrence-based models are very typical in text categorization field, in which researchers have tried to group words based on their co-occurrence statistics.

Next, the Semi-Supervision on Dependencies is discussed. The kernel value $K_d(d,d')$ is decided by the dependency type $g$ and $g'$ inside $d$ and $d'$, respectively. The Stanford dependency scheme defined totally 52 possible types of dependency, and plus the linear order edge type embodiments of the system add in the graph representation, one embodiment has 53 types of edges. The similarity between various edge types are different. The distribution patterns of dependency edges can be based on their co-occurrence relationship in the unlabeled text corpus, where a co-occurrence based method is applied to generate a similarity matrix between dependency types. Then soft matching between the dependency edges becomes $K_d(d,d')$=cooccurrence–similarity $(g,g')$, which provides further semantic evidence beyond words. Co-occurrence of two dependencies is defined as if such dependencies share a common word. That is, large dependency similarity indicates that corresponding dependencies are more likely to occur together.

Besides imposing semi-supervision on words and dependencies, embodiments of the system also introduce a semi-supervised learning strategy at the level of whole sentence. Embodiments of the system modify a "self-training" strategy to select unlabeled sentences that are highly likely to contain the target relation, and then add them as pseudo positive examples into the training set. This is motivated by the fact that the annotated data sets for RE are mostly very small which largely restricts the performance of relation extractions. Here embodiments of the system leverage more unlabeled sentences, which are highly likely to be positive (i.e., having relation of interest between entities), into training set in order to boost the detection performance.

Figure 5:
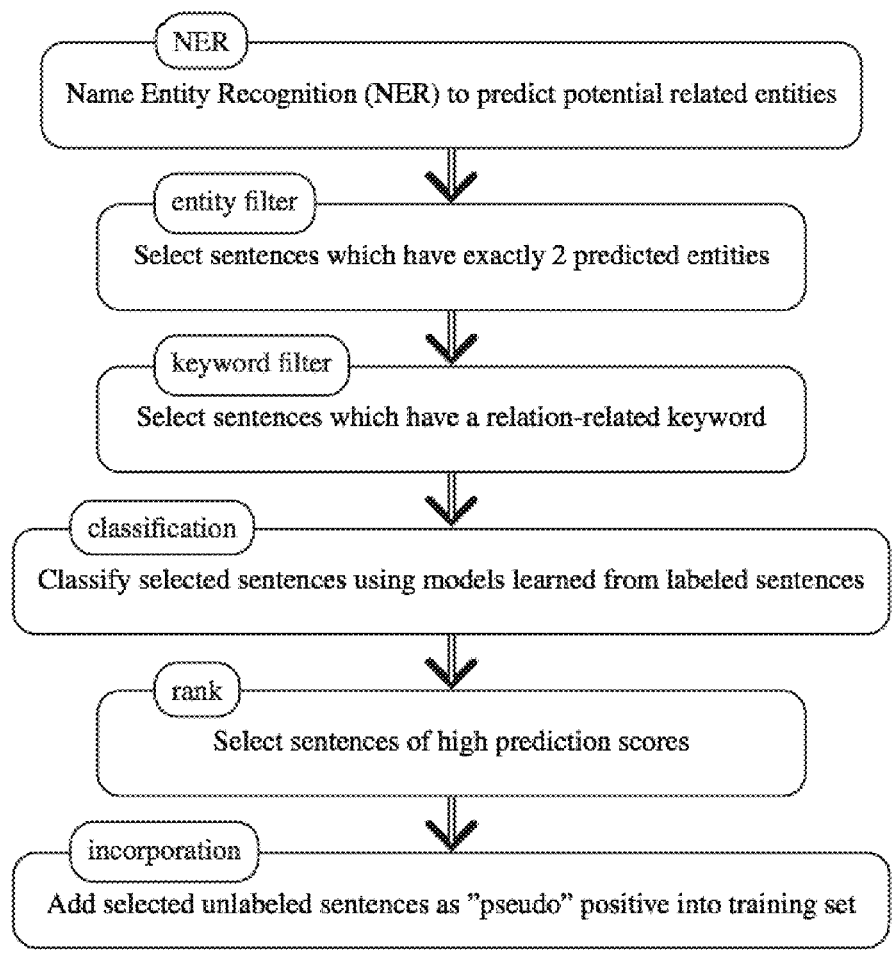
FIG. 5 shows an exemplary system to do semi-supervision with self-sentence-learning.

FIG. 5 shows an exemplary Self-Sentence-Learning (SSL) process. First, the process uses a name entity recognition (NER) to predict potential related entities (202). Next, using an entity filter, the process select sentences which have two predicted entities (204). Using a keyword filter, the process selects sentences with a relation-related keyword (206). The process then classifies selected sentences using models learned from labeled sentences (208). The process than ranks or selects sentences with high prediction scores (210), and the adds selected unlabeled sentences as "pseudo" positives into the training set (212).

One implementation of the framework relies on the Name Entity Recognizer (NER) to recognize entities of interest first. Then embodiments of the system apply a keyword filter to select those sentences with interested entities recognized and containing relation-related keywords (e.g. "coupled" for the interaction relationship). The selected sentences gets classified by an existing RE system that embodiments of the system build from labeled data. Those sentences having high prediction scores are then used as pseudo positive examples and added into a new round of RE model training.

In summary, the proposed method provides a number of advantages such as: a graph representation which encodes very rich semantic and syntactic information simultaneously; a multi-level semi-supervision, i.e., word embedding, dependency similarity and pseudo positive sentences; a convolution graph kernel which recovers relation patterns between entities; and a succinct manipulation of structured data without any requirement of manual adjustment.

Furthermore, most graph-related kernels need to be taken care of their computational costs. In case of the convolution graph kernels, computational efficiency indeed deserves some additional discussion. As embodiments of the system explained above, in order to generate a convolution graph kernel, two steps have to be completed. The first one is to find all possible single paths from all graphs under consideration. The second step is to compare path similarities. If these two steps are carried out independently, then the significant computation time can be wasted on doing the same calculation multiple times (i.e., calculation of similarity between two long single paths $p_1$ and $p_2$ involves the calculation of similarity between two short single paths $p'_1 \in p_1$ and $p'_2 \in p_2$). So in the implementation, embodiments of the system couple the two steps in order to perform the similarity calculation efficiently. All the single paths are found by finding short paths first and then extending them to longer ones. Path similarities are saved once they are calculated, and therefore they can be reused later when longer paths involve corresponding shorter paths.

The Semi-supervised Convolution Graph Kernel method is ideal for relation extraction from natural languages. The method takes advantages of typed dependency relations between words which result in graph representations of sentences. Then with two semi-supervised steps based upon unlabeled text sets, embodiments of the system represent each vertex on this graph with word embedding capturing contextual semantics, and describe each graph edge with their semantic categories. Furthermore, embodiments of the system construct pseudo training sentences utilizing unlabeled sentences in order to expand the training set and improve the prediction performance (i.e., semi-supervised learning on sentence level).

The proposed kernel provides a power model to capture both semantic and syntactic evidence inside natural sentences. Embodiments of the system demonstrate that the system reaches or outperforms the state-of-the-art performance on five relation extraction benchmark data sets from biomedical literature. Also with three levels of semi-supervisions, the system is feasible to work on RE problems with very few training examples.

Next, a semi-supervised sequence application is discussed. Bio-relation extraction (bRE), an important goal in bio-text mining, involves subtasks identifying relationships between bio-entities in text at multiple levels, e.g., at the article, sentence or relation level. A key limitation of current bRE systems is that they are restricted by the availability of annotated corpora. In this work we introduce a semi-supervised convolution approach that can tackle multi-level bRE via string comparisons with mismatches in the string kernel framework. The string kernel implements an abstraction step, which groups similar words to generate more abstract entities, by using semi-supervisions from unlabeled data. Specifically, two unsupervised models capture contextual (local or global) semantic similarities between words from a large unannotated corpus. This application is named as Abstraction-augmented String Kernel (ASK) which allows for better generalization of patterns learned from annotated data and provides a unified framework for solving bRE with multiple degrees of detail. ASK shows effective improvements over classic string kernels on four datasets and achieves state-of-the-art bRE performance without the need for complex linguistic features. Moreover to show generality, ASK is extended on one benchmark protein sequence classification task and get improved performances over all tested supervised and semi-supervised string kernel baselines.

One implementation handles "bio-relation extraction" (bRE) tasks, i.e. tasks that aim to discover biomedical relationships of interest reported in the literature through identifying the textual triggers with different levels of detail in the text. The implementation handles one important biological relation: protein-protein-interaction (PPI). In order to identify PPI events, the tasks aim to: (1) retrieve PubMed abstracts describing PPIs; (2) classify text sentences as PPI relevant or not relevant; (3) when protein entities have been recognized in the sentence, extract which protein-protein pairs having interaction relationship, i.e. pairwise PPI relations from the sentence. All targeted bRE tasks can be treated as problems of classifying sequences of words into certain classes. String kernels employs a convolution strategy to convert the word string into a vectorial feature space ofixed length (illustrated as (φ(x) later). Elements of this vectorial feature space describes the substructures of the text string, e.g. words, or word n-grams (n adjacent words from vocabulary D).

Figure 6:
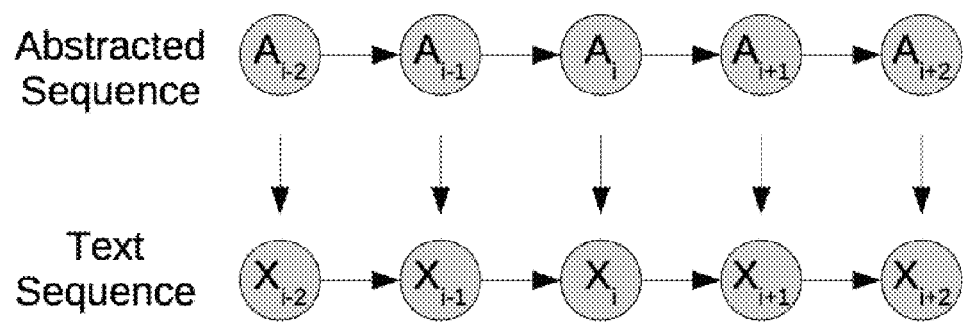
FIG. 6 shows an exemplary semi-supervised Abstraction-Augmented String Kernel.
Figure 7:
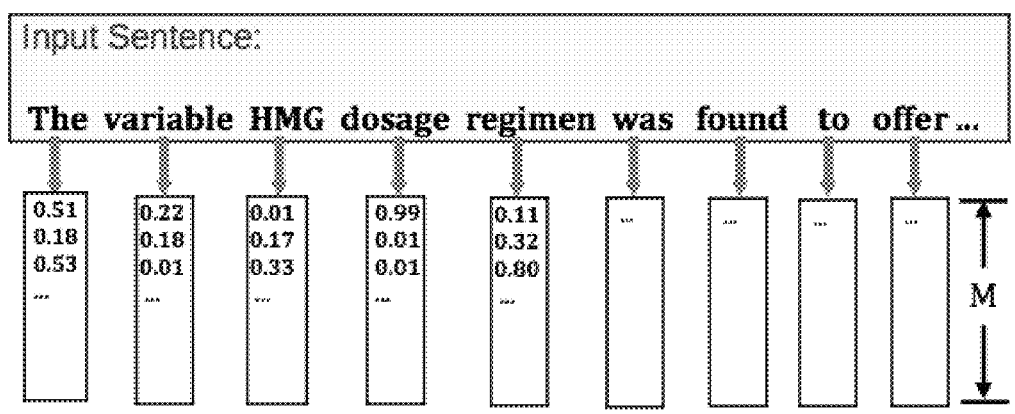
FIG. 7 shows an exemplary word embedding operation that maps each word in an input sentence to a vector of real values (with dimension) by learning from a large unlabeled corpus.

FIG. 6 shows an exemplary semi-supervised Abstraction-Augmented String Kernel (ASK). Both text sequence X and learned abstracted sequence A are used jointly, while FIG. 7 shows an exemplary word embedding operation that maps each word in an input sentence to a vector of real values (with dimension) by learning from a large unlabeled corpus.

The term "abstraction" describes an operation of grouping similar words to generate more abstract entities. The resulting abstract entities is referred to as "abstraction". ASK is accomplished in two steps: (i) learning word abstractions with unsupervised embedding and clustering; and (ii) constructing a string kernel on both words and word abstractions.

ASK relies on the key observation that individual words carry significant semantic information in natural language text. The system learns a mapping of each word to a vector of real values (called an "embedding" in the following) which describes this word's semantic meaning FIG. 6 illustrates this mapping step with an exemplar sentence. Two types of unsupervised auxiliary tasks are exploited to learn embedded feature representations from unlabeled text, which aim to capture:

Local semantic patterns: an unsupervised model is trained to capture words' semantic meanings in short text segments (e.g. text windows of 7 words).

Global semantic distribution: an unsupervised model is trained to capture words' semantic patterns in long text sequences (e.g. long paragraphs or full documents).

It can be observed that in most natural language text, semantically similar words can usually be exchanged with no impact on the sentence's basic meaning. For example, in a sentence like "EGFR interacts with an inhibitor" one can replace "interacts" with "binds" with no change in the sentence labeling. With this motivation, traditional language models estimate the probability of the next word being w in a language sequence. A different type of "language modeling" (LM) can be used which learns to embed normal English words into a M dimensional feature space by utilizing unlabeled sentences with an unsupervised auxiliary task.

The system constructs an auxiliary task which learns to predict whether a given text sequence (short word window) exists naturally in biomedical literature, or not. The real text fragments are labeled as positive examples, and negative text fragments are generated by random word substitution (in this paper we substitute the middle word by a random word). That is, LM tries to recognize if the word in the middle of the input window is related to its context or not. Note, the end goal is not the solution to the classification task itself, but the embedding of words into an M-dimensional space that are the parameters of the model. These will be used to effectively learn the abstraction for ASK.

A Neural Network (NN) architecture is used for this LM embedding learning. With a sliding window approach, values of words in the current window are concatenated and fed into subsequent layers which are classical neural network (NN) layers (with one hidden layer and another output layer, using sliding text windows of size 11). The word embeddings and parameters of the subsequent NN layers are all automatically trained by backpropagation. The model is trained with a ranking-type cost (with margin):

$$\sum_{s \in S} \sum_{w \in D} \max(0, 1 - f(s) + f(s^w)), \qquad (9)$$

where S is the set of possible local windows of text, D is the vocabulary of words, and $f(\bullet)$ represents the output of NN architecture and $s^w$ is a text window where the middle word has been replaced by a random word w (negative window as mentioned above). These learned embeddings give good representations of words where we take advantage of the complete context of a word (before and after) to predict its relevance. The training is handled with stochastic gradient descent which samples the cost online w.r.t. (s, w).

Since the local word embedding learns from very short text segments, it cannot capture similar words having long range relationships. Thus the system uses another auxiliary task which aims to catch word semantics within longer text sequences, e.g., full documents. Each word is represented as a vector in an M dimensional feature space. To capture semantic patterns in longer texts, the system models real articles in an unlabeled language corpus. Considering that words happen multiple times in documents, each document is represented as a weighted sum of its included words' embeddings, $$g(d) = \sum_{w \in d} c_d(w) E(w) - 0.5 \qquad (10)$$

where scalar $c_d(w)$ means the normalized tf-idf weight of word w on document d, and vector E(w) is the M-dim embedded representation of word w which would be learned automatically through backpropagation. The M-dimensional feature vector g(d) thus represents the semantic embedding of the current document d.

Similar to the LM, we try to force $g(\bullet)$ of two documents with similar meanings to have closer representations, and force two documents with different meanings to have dissimilar representations. For an unlabeled document set, we adopt the following procedure to generate a pseudo-supervised signals for training of this model. We split a document a into two sections: $a_0$ and $a_1$, and assume that (in natural language) the similarity between two sections $a_0$ and $a_1$ is larger than the similarity between $a_i$ (i∈{0,1}) and one section $b_j$ (j∈{0,1}) from another random document b: that is $$f(g(a_0), g(a_1)) > f(g(a_i), g(b_j)) \qquad (11)$$

where $f(\bullet)$ represents a similarity measure on the document representation $g(\bullet)$. $f(\bullet)$ is chosen as the cosine similarity in our experiments. Naturally the above assumption comes to minimize a margin ranking loss:

$$\sum_{(a,b) \in A} \sum_{i,j=0,1} \max(0, 1 - f(g(a_i), g(a_{1-i})) + f(g(a_i), g(b_j))) \qquad (12)$$

where i∈{0,1}, j∈{0,1} and A represents all documents in the unlabeled set. The system trains E(w) using stochastic gradient descent, where iteratively, one picks a random tuple from ($a_i$ and $b_j$) and makes a gradient step for that tuple. The stochastic method scales well to the large unlabeled corpus and is easy to implement.

As shown in the table below, example words mapped to the same "abstraction" as the query word (first column) according to two different embeddings. "Local" embedding captures part-of-speech and "local" semantics, while "global" embedding found words semantically close in their long range topics across a document.

TABLE 1

Example words mapped to the same "abstraction" as the query word (first column) according to two different embeddings. "Local" embedding captures part-of-speech and "local" semantics, while "global" embedding found words semantically close in their long range topics across a document.

| Query | Local ASK | Global ASK |
|---|---|---|
| protein | ligand, subunit, receptor, molecule | proteins, cosNUM, phosphoprotein, isoform |
| medical | surgical, dental, preventive, reconstructive | hospital, investigated, research, urology |
| interact | cooperate, compete, interfere, react | interacting, interacts, associate, member |
| immunoprecipitation | co-immunoprecipitation, EMSA, autoradiography, RT-PCR | coexpression, two-hybrid, phosphorylated, tbp |

Abstraction using Vector Quantization is discussed next. "Abstraction" means grouping similar words to generate more abstract entities. The system groups words according to their embedded feature representations from either of the two embedding tasks described above. For a given word w, the auxiliary tasks learn to define a feature vector $E(w) \in R^M$. Similar feature vectors $E(w)$ can indicate semantic closeness of the words. Grouping similar $E(w)$ into compact entities might give stronger indications of the target patterns. Simultaneously, this will also make the resulting kernel tractable to compute.

As a classical lossy data compression method in the field of signal processing, Vector quantization (VQ) is utilized here to achieve the abstraction operation. The input vectors are quantized (clustered) into different groups via "prototype vectors". VQ summarizes the distribution of input vectors with their matched prototype vectors. The set of all prototype vectors is called the codebook. C represents the codebook set which includes N prototype vectors, $C=\{C_1, C_2, \ldots, C_N\}$.

Formally speaking, VQ tries to optimize (minimize) the following objective function, in order to find the codebook C and in order to best quantize each input vector into its matched prototype vector, $$\sum_{i=1 \ldots |D|} \|E(w_i) - C_n\|^2, n \in \{1 \ldots N\} \quad (13)$$

where $E(w_i) \in R^M$ is the embedding of word $w_i$. Hence, a basic VQ is essentially a k-means clustering approach.

For a given word w, the index of the prototype vector $C_j$ that is closest to $E(w)$ is its abstraction.

Unlike standard string kernels which use words directly from the input text, semi-supervised ASK combines word sequences with word abstractions. The word abstractions are learned to capture local and global semantic patterns of words (described above). Using learned embeddings to group words into abstractions could give stronger indications of the target pattern. For example, in local ASK, the word "protein" is grouped with terms like "ligand", "receptor", or "molecule". This abstraction could improve the string kernel matching since it provides a good summarization of the involved parties related to target event patterns.

The semi-supervised abstraction-augmented string kernel is as follows $$K(x,y) = \langle (\phi(x),\phi'(a(x))),(\phi(y),\phi'(a(y))) \rangle \quad (14)$$

where $(\phi(x),\phi'(a(x)))$ extends the basic n-gram representation $\phi(x)$ with the representation $\phi'(a(x))$. $\phi'(a(x))$ is a n-gram representation of the abstraction sequence, where $$a(x)=(a(x_1), \ldots, a(x_{|x|}))=(A_1, \ldots, A_{|x|}) \quad (15)$$

$|x|$ means the length of the sequence and its $i_{th}$ item is $A_i \in \{1 \ldots N\}$. The abstraction sequence a(x) is learned through the embedding and abstraction steps.

The abstraction kernel exhibits a number of properties:
It is a wrapper approach and can be used to extend both supervised and semi-supervised string kernels.
It is very efficient as it has linear cost in the input length.
It provides two unsupervised models for word-feature learning from unlabeled text.
The baseline supervised or semi-supervised models can learn if the learned abstractions are relevant or not.
It provides a unified framework for bRE at multiple levels where tasks have small training sets.
It is quite general and not restricted to the biomedical text domain, since no domain specific knowledge is necessary for the training
It can incorporate other types of word similarities (e.g., obtained from classical latent semantic indexing).

The task of relation extraction from text is important in biomedical domains, since most scientific discoveries describe biological relationships between bio-entities and are communicated through publications or reports. In summary, the system can detect and extract relations from biomedical literature using string kernels with semi-supervised extensions, named Abstraction-augmented String Kernels (ASK). The semi-supervised "abstraction" augmentation strategy is applied on a string kernel to leverage supervised event extraction with unlabeled data. The "abstraction" approach includes two stages: (1) Two unsupervised auxiliary tasks learn accurate word representations from contextual semantic similarity of words in biomedical literature, with one task focusing on short local neighborhoods (local ASK), and the other using long paragraphs as word context (global ASK). (2) Words are grouped to generate more abstract entities according to their learned representations. On benchmark PPI extraction data sets targeting three text levels, the kernel achieves state-of-the-art performance and improves over classic string kernels.

Furthermore, ASK is a general sequence modeling approach and not tied to the multi-level bRE applications. The generality is shown by extending ASK to a benchmark protein sequence classification task, i.e. measuring the degree of structural homology between protein sequences (also known as remote protein homology prediction) which is a fundamental and difficult problem in biomedical research. Local embedding in local ASK is trained on a large unlabeled protein sequence dataset. where each amino acid is treated as a word in this case. Local ASK get improved performances over all tested supervised and semi-supervised string kernel baselines. The use of the abstracted alphabet (rather than using standard amino-acid letters) effectively captures similarity between otherwise symbolically different amino-acids.

The system may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

Figure 8:
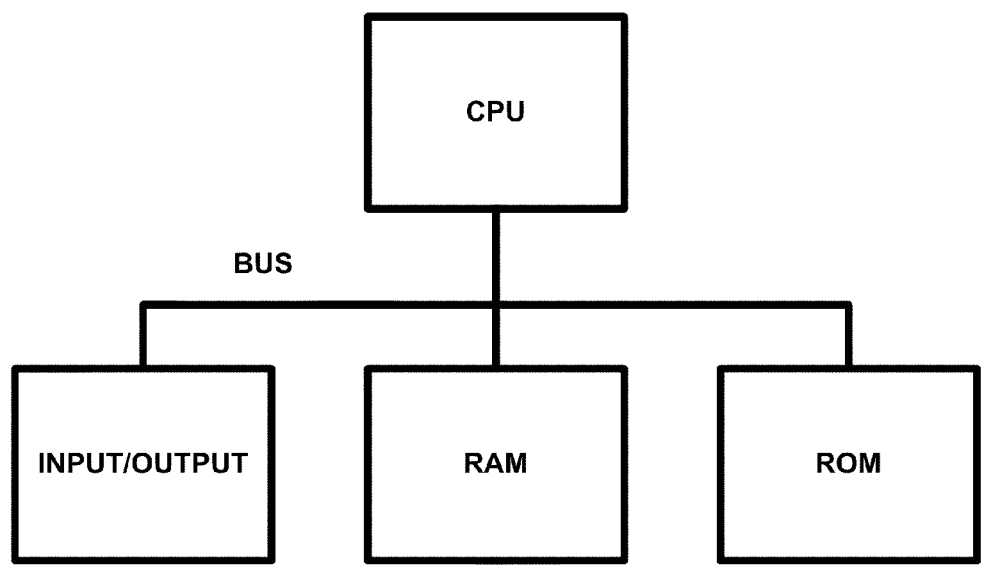
FIG. 8 shows an exemplary computer system to execute computer readable to detect patterns of interest.

By way of example, a mobile device shown in FIG. 8 preferably includes a processor, random access memory (RAM), a program memory (preferably a writable read-only memory (ROM) such as a flash ROM) and an input/output (I/O) controller coupled by a CPU bus. The computer may optionally include a flash drive controller which is coupled to a hard disk and CPU bus. Flash memory may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Executable instructions are storable in the memory and executable by the processor 202 perform various functions according to embodiments of the present disclosure. Memory can additionally store various information, e.g., information relating to particular, available, advertising content as well as the advertising content itself. This advertising content can include a brand name such as a name of a particular product, service, and/or company, as well as associated content, such as games, short-form video, animation, or consumer marketing material. For example, as will be described in more detail below, the memory can store information that represents a number of advertising channels that may be provided to the display. The memory can store various audio and visual content associated with the number of advertising channels, e.g., the advertisement content itself, that may be provided to the display. The memory of the mobile phone can include an operating system such as J2ME stored in a read only memory (ROM). The memory can also include random access memory (RAM), flash memory, etc. Thus, various memory on the mobile phone is available to store program instructions, routines, and applications.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language.

While various embodiments of the present invention have been described above, it should be understood that they have been presented by way of example only, and not of limitation. Likewise, the various diagrams may depict an example architectural or other configuration for the invention, which is done to aid in understanding the features and functionality that may be included in the invention. The invention is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the present invention. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

What is claimed is:

1. A method to perform relation extraction in text, comprising:

applying a convolution strategy to determine a kernel between sentences;

deriving an unweighted undirected graph $G_D(S)$ for a sentence S from a set of dependency relations supplemented by a linear-order structure, where the set is denoted by D(S) and V(S) is the set of vertices, with each $v_i \in V(S)$ representing a certain word $$G_D(S)=(V(S),E(S));$$

determining a single path p from a dependency graph $G_D(S)$ composed from a sequence of words and their associated dependencies $$p=(w_i, d_{i,j}, w_j, \ldots, w_p, d_{p,q}, w_q)$$

where word $w_i$ and $w_j$ are connected by the dependency edge $d_{i,j}$;

determining a convolution kernel $K_G$ as a sum of kernels on paths ($K_p$):

$$K_G(G_D(S), G_D(S')) = \sum_{p \in P''(G_D(S))} \sum_{p' \in P''(G_D(S'))} K_p(p, p') Pr(p|G_D(S)) Pr(p'|G_D(S'))$$

where $Pr(p|G_D(S))$ is a probability that single path p happens in the graph $G_D(S)$ and calculated as a ratio of path count over sum of path counts;

applying one or more semi-supervised strategies to the kernel to encode syntactic and semantic information to recover a relational pattern of interest; and applying a classifier to the kernel to identify the relational pattern of interest in the text in response to a query.

2. The method of claim 1, comprising applying the convolution strategy on one or more sequence kernels to extract relationship.

3. The method of claim 1, comprising applying a convolution strategy on a graph kernel or a string kernel to extract relationship.

4. The method of claim 1, wherein one of the semi-supervised strategies relates to add-ons to a word sequence to represent natural English sentences.

5. The method of claim 1, wherein one of the semi-supervised strategies is added on a graph kernel or a string kernel to consider semantics of natural English words using word embedding representations.

6. The method of claim 1, wherein one of the semi-supervised strategies are added on to sequence kernels to encode semantic evidence inside English text.

7. The method of claim 1, comprising generating a graph kernel with semi-supervision added to one of: nodes, edges and whole graphs.

8. The method of claim 1, comprising generating a graph convolution kernel to extract relationship.

9. The method of claim 1, comprising applying a string kernel to solve relation extraction.

10. The method of claim 1, comprising a graph convolution kernel with a sentence representation to simultaneously encode semantic and syntactic information.

11. The method of claim 1, comprising applying a semi-supervised string kernel in a unified framework for solving relationship extraction at multiple levels.

12. The method of claim 11, wherein the levels include an article level, a sentence level, and a relation level.

13. The method of claim 1, wherein the semi-supervised strategies include strategies on word embedding, dependency similarity and pseudo positive sentences.

14. The method of claim 1, comprising generating a convolution graph kernel to recover relation patterns between entities.

15. The method of claim 1, comprising generating a convolution graph kernel by determining single paths from graphs and comparing path similarities.

16. The method of claim 1, comprising
determining single paths by finding short paths first and extending short paths to longer ones;
saving path similarities for subsequent reuse on longer paths that involve corresponding shorter paths.

17. The method of claim 1, comprising performing semi-supervised learning on sentence level.

18. The method of claim 17, comprising constructing pseudo training sentences utilizing unlabeled sentences to expand a training set.

19. The method of claim 1, comprising:
representing dependency relations between words as a graph of sentences;
representing each vertex on the graph with word embedding contextual semantics;
describing each graph edge with one or more semantic categories; and
applying semi-supervised analysis to unlabeled text sets.

20. The method of claim 1, comprising applying a semi-supervised string kernel to protein sequence classification.

21. The method of claim 20, comprising training an embedding for each amino acid based on unlabeled protein sequence data set.

22. The method of claim 1, comprising adding semi-supervised strategy on string kernel.

23. The method of claim 22, comprising grouping similar words to generate one or more abstract entities (abstraction).

24. The method of claim 23, wherein the grouping of similar words relies on semi-supervised embeddings of words from unlabeled data.

25. The method of claim 22, comprising using original text sequence and learned abstracted sequence jointly.

* * * * *